(12) United States Patent
Gunther et al.

(10) Patent No.: US 10,877,635 B2
(45) Date of Patent: *Dec. 29, 2020

(54) SYSTEM AND METHOD FOR THE CAPTURE OF MOBILE BEHAVIOR, USAGE, OR CONTENT EXPOSURE

(71) Applicant: Embee Mobile, Inc., San Francisco, CA (US)

(72) Inventors: Steven Gunther, San Francisco, CA (US); Russell Tillitt, San Francisco, CA (US)

(73) Assignee: Embee Mobile, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/978,564

(22) Filed: May 14, 2018

(65) Prior Publication Data

US 2018/0329591 A1      Nov. 15, 2018

Related U.S. Application Data

(63) Continuation of application No. 15/976,484, filed on May 10, 2018.

(Continued)

(51) Int. Cl.
*G06F 3/0483* (2013.01)
*H04L 29/08* (2006.01)
(Continued)

(52) U.S. Cl.
CPC .......... *G06F 3/0483* (2013.01); *G06F 3/0481* (2013.01); *G06Q 30/0201* (2013.01); *H04L 67/22* (2013.01); *G06F 3/04842* (2013.01)

(58) Field of Classification Search
None
See application file for complete search history.

(56) References Cited

U.S. PATENT DOCUMENTS 8,126,962 B1 * 2/2012 Schnedler ........... H04L 12/4633
                                                             709/203
8,924,942 B1   12/2014 Makuch et al.
(Continued)

FOREIGN PATENT DOCUMENTS

KR     1020120028885 A     3/2012
KR       20150110653 A    10/2015
(Continued)

OTHER PUBLICATIONS

AndroidSDK, "AccessibilityService" [retrieved on Jan. 17, 2020], WayBack Machine, Apr. 6, 2016, <URL: https://web.archive.org/web /20160406055924/https://developer.android.com/reference/android/accessibilityservice/AccessibilityService.html>. (Year: 2016).*

(Continued)

*Primary Examiner* — Christopher J Fibbi
(74) *Attorney, Agent, or Firm* — Pillsbury Winthrop Shaw Pittman, LLP

(57) ABSTRACT

Provided is a process to detect a web-browser address bar in a UI layout based on communications with an accessibility application program interface (API) of an operating system and detect navigation events in the same via the accessibility API.

42 Claims, 4 Drawing Sheets

Related U.S. Application Data

(60) Provisional application No. 62/504,160, filed on May 10, 2017.

(51) Int. Cl.
*G06Q 30/02* (2012.01)
*G06F 3/0481* (2013.01)
*G06F 3/0484* (2013.01)

(56) References Cited

U.S. PATENT DOCUMENTS

| | | |
|---|---|---|
| 2006/0136524 A1* | 6/2006 | Wohlers .................. H04L 67/02 |
| 2008/0046562 A1 | 2/2008 | Butler |
| 2010/0269122 A1 | 10/2010 | Malinowski |
| 2011/0157196 A1 | 6/2011 | Nave |
| 2012/0066411 A1 | 3/2012 | Jeide et al. |
| 2012/0084133 A1* | 4/2012 | Ross .................. G06F 11/3438 705/14.27 |
| 2012/0110459 A1 | 5/2012 | Drory |
| 2013/0219323 A1* | 8/2013 | Kalu ....................... G06F 21/35 715/780 |
| 2013/0304906 A1* | 11/2013 | Yavilevich .............. H04L 67/22 709/224 |
| 2014/0149586 A1* | 5/2014 | Clapp .................... H04L 67/02 709/224 |
| 2015/0279070 A1 | 10/2015 | Nandakumar et al. |
| 2016/0063611 A1 | 3/2016 | Davis |
| 2016/0132301 A1 | 5/2016 | Riscutia et al. |
| 2016/0234624 A1 | 8/2016 | Riva et al. |
| 2016/0323307 A1* | 11/2016 | Savant ................. G06F 21/6218 |
| 2016/0330223 A1 | 11/2016 | Sridhara et al. |
| 2016/0335286 A1 | 11/2016 | Desineni et al. |
| 2016/0335316 A1 | 11/2016 | Riva et al. |
| 2016/0335333 A1 | 11/2016 | Desineni et al. |
| 2016/0335356 A1 | 11/2016 | Desineni |
| 2017/0316092 A1* | 11/2017 | Fichter .................. G06F 16/958 |

FOREIGN PATENT DOCUMENTS

| | | |
|---|---|---|
| KR | 1020150110653 A | 10/2015 |
| WO | 2011103425 A1 | 8/2011 |
| WO | 2014116977 A2 | 7/2014 |
| WO | 2015049420 A1 | 4/2015 |
| WO | 2016178789 A1 | 11/2016 |

OTHER PUBLICATIONS

International Search Report and Written Opinion for Related PCT Application No. PCT/US2018/032091 dated Nov. 12, 2018, pp. 1 to 12.

International Preliminary Report on Patentability mailed in related international application No. PCT/US2018/032091 dated Nov. 21, 2019 (7 pages).

Non-Final Office Action in related U.S. Appl. No. 15/976,484 dated Feb. 21, 2020 (46 pages).

Final Office Action in related U.S. Appl. No. 15/976,484 dated Sep. 4, 2020 (58 pages).

Supplemental European Search Report in related EP Application No. 18 79 9196 (9 pages).

* cited by examiner

SYSTEM AND METHOD FOR THE CAPTURE OF MOBILE BEHAVIOR, USAGE, OR CONTENT EXPOSURE

CROSS-REFERENCE TO RELATED APPLICATIONS

This present patent filing is a continuation of U.S. patent application Ser. No. 15/976,484, filed 10 May 2018, titled SYSTEM AND METHOD FOR THE CAPTURE OF MOBILE BEHAVIOR, USAGE, OR CONTENT EXPOSURE, which claims the benefit of U.S. Provisional Patent Application 62/504,160, filed 10 May 2017, titled SYSTEM AND METHOD FOR THE CAPTURE OF MOBILE BEHAVIOR, USAGE, AND CONTENT. The entire content of each afore-listed earlier-filed application is hereby incorporated by reference for all purposes.

BACKGROUND

1. Field

The present disclosure relates generally to client-side computing analytics and, more specifically, a system and method for the capture of mobile behavior, usage, or content exposure.

2. Description of the Related Art

Independent market research and measurement plays a fundamental role in maximizing the availability of choices for consumers. Entire industries would not exist were it not for the availability of technologies and companies who independently collect and sell research data regarding the products, services, and media that consumers enjoy every day. For example, had something similar to Nielsen Ratings™ not come into existence, such that the only source for audience data were the TV networks themselves, there would be a strong incentive for bias and thus advertisers would not have had a trustworthy source for making buying decisions. An ad-supported network TV industry fundamentally creates the need for, and entirely relies upon, sources of independent audience measurement. Similarly, consumers rely on sources of independent measurement to make their own buying decisions, such as which mobile network has the best coverage in their area. If the only source of data comes from their service providers themselves, then consumers are hurt by a lack of unbiased data regarding the choices available in that market.

While many such independent research technologies and methods exist, many of these technologies are fast becoming obsolete due to the rapid evolution of technology and shifts in user preferences. Among these changes is the convergence of three critical forces: the fragmentation of media and internet consumption away from household TVs and desktop PCs, and towards a variety of personal and mobile devices; the shift of user preferences away from visiting websites using desktop-type browsers as the primary portal to products, services and media, where markup language and other source code can be inspected and communications and other behavior can be more easily intercepted and tracked, and towards using mobile applications (e.g., applications compiled with a mobile OS as a target and not necessarily compiled by the mobile device) for those same products, services and media, where all functionality and communications are hidden from view; and, thanks in part to the aforementioned shifts, the massive increase in the amounts of data being collected by social networks, mobile networks and ISPs, resulting in increasingly immense market power being concentrated into fewer and fewer hands. Left unchecked, these forces will inevitably result in less competitive markets, lost productive innovations, and fewer consumer choices.

It is for these reasons that it is crucially important that new independent research methods are developed to keep apace these technical changes and forces, especially with regards to how people use their mobile devices, as these mobile devices now overwhelmingly represent the primary portals into what people see, watch and buy. However, despite the critical need, there has been surprisingly little innovation in this space in recent years. The primary methods in use today, in fact, are largely extensions of earlier generation "clickstream" based data collection methods. Such methods usually amount to implementing a "man-in-the-middle" type solution, typically via a virtual private network (VPN) or similar proxy-based solution, where remote communications between the user's device and other remote entities can be intercepted, logged and then forwarded to its destination. The data is analyzed to gain insight into what users see, watch, and buy. However, these methods come with substantial deployment challenges, and as well they are being technically obviated by the same forces mentioned above.

Firstly, VPN-type solutions result in substantial increases in costs, cause disruptions to device and network performance, and come with severe scalability limits and global deployment limits. Additionally, such solutions present troublesome privacy concerns, and potentially give rise to regulatory concerns in many jurisdictions. On top of that, even when all those challenges can be overcome, VPN-type solutions are furthermore typically limited to those cases where the traffic is either not encrypted, or where the traffic is encrypted on the device with a custom certificate deployed by the VPN provider. Precisely for that reason, most popular and common applications utilize "certificate-pinning," a method of ignoring custom certificates so as to keep their communications safe from man-in-the-middle interceptions. Facebook™, Snapchat™, WhatsApp™ and many other common and popular apps utilize these methods to ensure their data communications cannot be inspected by third parties. Additionally, the mobile device platforms themselves are increasingly preventing the usage of custom certificates, and making other changes, to further restrict the availability of third parties to view that traffic. Google's Android OS™ has already started making certificate-pinning the default behavior for all apps as of Android 7, and begun blocking access to "traffic stats" without end-user intervention. It is possible iOS may likewise follow suit. These changes have only the superficial benefit of increasing user privacy, for in fact it is just increasing the degree to which user data is concentrated into fewer hands, and hidden from independent third party measurement. As users migrate to devices with these limitations, VPN-type solutions, and other similar solutions, are rendered obsolete.

In short, many traditional computer systems for measuring consumer behavior on networks analyzed network traffic, e.g., noting patterns in which websites are visited or social media behavior. But recent trends are denying those computer systems the signals upon which they rely. Robust end-to-end encryption shields user communication from parties having access to network traffic, and native applications do not generate observable signals indicative of consumer behavior in the same way that web usage did

SUMMARY

The following is a non-exhaustive listing of some aspects of the present techniques. These and other aspects are described in the following disclosure.

Some aspects include a process, including: executing, on a mobile computing device, a monitoring service configured to communicate with an accessibility application program interface (API) of an operating system of a mobile computing device, wherein: the accessibility API reports state of a user interface (UI) layout displayed by the mobile computing device to the monitoring service, the accessibility API reports UI events indicative of changes in the UI layout to the monitoring service, and the monitoring service executes in one or more processes that are different from processes of at least some applications monitored by the monitoring service on the mobile computing device; receiving, with the monitoring service, a first UI event indicating focus of the UI has shifted to a first application; in response to receiving the first UI event, with the monitoring service, based on parameters of the first event, determining that the first application is an instance of a web browser; in response to determining that the first application is an instance of a web browser, with the monitoring service, selecting a first UI layout component as including a web-browser address bar of the first application from among a plurality of UI layout components of a UI layout of the first application, wherein: the selected first UI layout component is selected based on both detecting a pattern of UI events in a sequence of events received by the monitoring service from the operating system and an attribute of the selected first UI layout component, and the pattern of UI events includes at least one UI event indicative of a user interaction and having a UI event parameter that associates the event with the selected first UI layout component; storing, in memory accessible to the monitoring service, an identifier of the selected UI layout component in association with the first application to indicate that the selected UI layout component includes the web-browser address bar of the first application.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
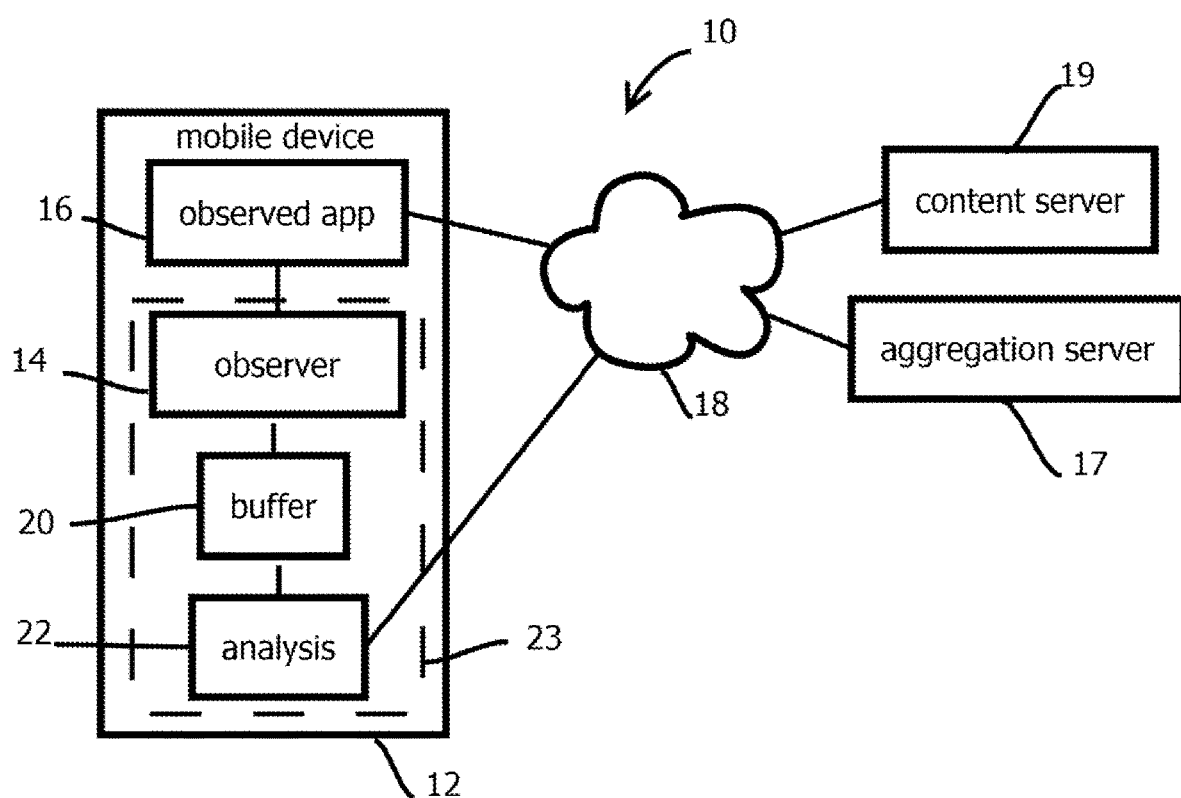
FIG. 1 illustrates an example computing environment in accordance with some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of research analytics and mobile application design. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

It is for the reasons above that the invention disclosed herein is so important (which is not to imply that embodiments are narrowly limited to systems that mitigate every enumerated problem). With the shift of users from desktop to mobile, from browser to app, and the resulting collection of user behavior data that is being secretly amassed by a few, immensely powerful companies, there yet remains but one location uncompromised by these forces, and where independent and unbiased third party measurement may be still be possible: the screen. It is on the screen, or more generally, in the human-to-machine interface, where what is written must be readable and what is shown must be seeable. Embodiments leverage this basic insight, along with the related hardware capabilities and APIs specific to personal mobile devices in particular, to enable a system and method that, with user consent, can independently capture what people see and do on the screen of their mobile devices. This invention is non-obvious, novel and, most of all, critically useful.

Further, existing screen scraping software applications are not well suited for mobile use cases. Existing systems typically are not compliant with modern mobile OS's. Many older systems screen scrape data by accessing a computer system's terminal memory through an auxiliary port. Modern mobile OS's often do not expose these interfaces. Some computer systems for screen scraping are not suitable to the mobile environment due to heavy computational overhead and battery consumption, e.g., some older systems captured a bitmap of a display and performed optical character recognition on the display, which consumes scarce battery power on a mobile device for local OCR or scarce bandwidth when screen captures are uploaded to a remote server.

Some embodiments include a mobile device, or a similarly configured computational device ("device"), where the device includes a touchscreen or similarly capable human-to-machine interface ("screen"), and application programming interfaces and services or similar capabilities ("accessibility services"), which can notify an application running on the device of information regarding visual elements on the screen, and additionally can capture changes in state to those elements on the screen; and, the process(es) that utilize those accessibility services to perform logic which is specific to the use cases under study, and furthermore does so in a manner that is performance sensitive so as not to impact the user experience or have other adverse impacts.

Some embodiments include a tangible, non-transitory, machine-readable memory storing instructions that when executed on a mobile computing device give rise to the functionality described herein.

In one embodiment of the invention, the system includes a mobile device with touchscreen interface and running the Android™ operating system (or other OS, like iOS™) with accessibility services that notify an application of when there have been state changes to the content on the screen, and logic that monitors for specific state changes to the screen, e.g., for specifically "browser-enabled" applications, which includes both standalone web browsers applications as well as other native applications that provide the ability to browse online and display online content accessed via URL entered into a UI element of the native application. Thus, some embodiments include an OS, having an accessibility service, and executing an observed application. In some cases, an observer application may register with the mobile OS to subscribe to events emitted by the accessibility service (or otherwise interface with the service), and that observer application may receive data indicative of changes in state of displayed information. In some cases, the observer application may subscribe to callbacks by the OS when AccessibilityEvents are fired. Thus, the observer application may execute asynchronously of the observed application as a background process and thereby avoid interfering with the user interface or user experience (e.g., by causing a lag between when a gesture is entered and when the display is updated to reflect the gesture).

In some embodiments of the invention, this logic (e.g., software) implements (or calls) methods defined by Android's AccessibilityService interface, which enables the logic to be notified upon gestures or other actions that may cause state changes to specific elements of interest. Such elements of interest may be the state of the text box that contains the URL that is uppermost and to the left, which is the most common location of the "address bar", the destination to which the browser has been directed. A gesture that may generate a state change may be someone typing a new URL in the address bar, or pressing enter, swiping the screen, or many other such gestures.

In some cases, the data received by the observer application includes information displayed on the screen and metadata about that information, such as markup indicating where on the screen the information is displayed or a visual weight of the information in the display. In some cases, the data received by the observer application includes text data, rather than just a bitmap or other image of the screen. In some cases, the observer application may receive (after requesting responsive to an event) a tree of AccessibilityWindowInfo and AccessibilityNodeInfo objects. Some embodiments may traverse this tree (e.g., with a depth first or breadth first traversal) to detect patterns (e.g., specified by regular expressions) indicative of particular visual elements.

In some embodiments of the invention, the logic additionally incorporates a filter (e.g., of events, screen content, or both) to evaluate these state changes to ensure that it only captures events of interest, as opposed to every possible state change that may occur, so as to minimize negative performance impact, either perceptual or non-perceptual, to the end-user. For the purpose of further articulating this embodiment, a list of rules for when to capture a state change may include, but are not limited to, the following:

When the user finishes typing a URL using the keyboard into the address bar and hits enter, that URL is captured When an entered URL is redirected to another URL, that new URL is also captured. Note this may sometimes result in duplicate entries. For example, when the user types "cnn.com" and hits enter, the browser is redirected to "www.cnn.com". In this case, both "cnn.com" & "www.cnn.com" may be captured.

When the user clicks on a link in the currently displayed web page, such as an ad, the new URL for that link will be captured. This could be a link pointing to the same domain or a different domain.

When the user navigates from Page A to Page B and then hits the back button, the URL for Page A may be captured again in some browser applications.

When the user types in "search key words" instead of a particular URL, only the URL that is rendered is captured. For example, if the user types "latest nba scores" in the URL address bar, and hits enter, a URL that will be captured might look as follows:

"https://www.google.com/search?q=latest+nba+scores&oq=latest+nba+scores&aqs=chrome.69i57j0l3.9203j0j4&client=ms-android-google&sourceid=chrome-mobile&ie=UTF-8"

If the user enters a URL that has a valid URL format, but the URL is for a non-existent destination, and the browser application cannot retrieve it, the URL is still captured.

In some browser applications, when a new URL is typed into the address bar, the previous URL is briefly displayed before the new webpage is displayed. In this case, previous URL may be captured again.

In this manner, this embodiment of the invention provides an alternate solution for capturing a collection of URLs that a user has visited and clicked, commonly referred to as "clickstream data". This is precisely the type of clickstream data that was once broadly possible to collect using legacy VPN-type solutions, except without the privacy, legal, performance and technological changes of legacy VPN-type solutions articulated above. This embodiment of the invention is a superior solution to the legacy solutions.

Furthermore, as would be readily evident to those practiced in the art, the embodiment articulated above is but one embodiment of the invention. Other embodiments of the invention may include, but are not limited to:

What videos are watched in video apps, such as YouTube, Netflix and Hulu, and others.

What products are being searched for and purchased on mobile e-commerce websites or in mobile e-commerce apps, such as Amazon, eBay, and others.

What ads are being seen and clicked on, and in which webpage or app was that ad impression delivered, and what other information can be correlated with the owner of that device such as demographics, locations and similar.

Additionally, some embodiments of the invention could utilize other similarly configured devices that use a different operating system, such as iOS™, and that provide analogous hardware and API capabilities.

As the embodiments of the invention described above demonstrate, at its essence the invention is a non-obvious and novel solution for capturing user behavior data because it changes the point at which (or adds an additional point at which) the measurement is performed: whereas legacy solutions may collect data at the point of transmission by intercepting communications, the invention instead collects the data at the point of display by intelligently analyzing information on the screen. By combining the specific capabilities of certain types of mobile devices, in particular those with touchscreens and the APIs for understanding the content of those touchscreens, with a methodology that collects and analyzes specific visual elements on those touchscreens, the invention is immensely useful for enabling the independent collection of data regarding what people see and do on their mobile devices, which is increasingly critical to ensuring that businesses and consumers have access to accurate data, competitive markets, and maximum consumer choice.

FIG. 1 shows an example of a computing environment 10 in which the present techniques may be implemented. In some cases, a mobile device 12 (which may be one of many, e.g., more than 1 million) may execute a mobile OS in which an observer application 23 and observed application 16 execute. In some cases, the observer application 23 may include an observer module 14, a buffer 20, and an analysis module 22. The observer module 14 may receive events, filter events, request screen content, traverse and filter screen content, and instruct the buffer 20 to buffer resulting screen-state-change records (e.g., a list of URL's to which the user navigated). In some embodiments, the user may navigate, with a touchscreen gesture or voice command, to a URL of a content server 19 with the observed application 16 and receive and render content on the screen of the mobile device 12. In some cases, both the request for content and the returned content may be encrypted, e.g., with TLS. In some embodiments, responsive to the event (or other event, such as one indicating the screen has updated), the observer application 23 may gather data with the techniques discussed above.

In some embodiments, analysis of the buffered data may be performed client-side, e.g., with the analysis module 22, for instance periodically or in response to the buffer being updated. In some cases, the analysis module may filter the buffered observations or aggregate the buffered observations. Performing some analysis client side is expected to reduce the amount of bandwidth and power consumed by transmitting data to the aggregation server 17.

In some embodiments, the observer application 23 may report the buffered and analyzed data to an aggregation server 17, e.g., in an anonymized record that includes a non-personally-identifiable device identifier, via the Internet 18 and using various wireless networks. In some embodiments, the server 17, or related computing device, may analyze these records to extract insights about aggregate or individual consumer behavior. Some embodiments may output reports indicative of such analysis.

Tracking Web Navigation on Mobile Devices without Reliable Access to Network Events or a Privileged Position on a Browser For a variety of reasons, it is useful to track which websites people visit with their computing devices. Previously, this could be done by monitoring network events (e.g., communications with or within the OS's network stack), but modern OS's (particularly mobile OS's) interfere with this approach, in some cases, by removing more permissive API's by which behavior was measured, and in some cases, by impeding analysis of network traffic through, for instance, transport-layer security encryption that impedes man-in-the middle interfaces to network traffic.

An alternative is a browser extension, but in many cases, the user chooses to not install an extension, the browser does not support extensions (particularly in the mobile context), or the user has multiple browsers on the mobile device and some do not support extensions.

Another alternative is to screen-scrape the user-interface layout at a lower level than of the application. For instance, by interrogating UI layout components operated upon by a display server (e.g., SurfaceFlinger or Quartz Compositor) based upon outputs from the application to the OS. It is important to keep in mind that these UI components are distinct from those in the data model of the application, e.g., the DOM in a web browser, and indeed some embodiments do not have direct access to the DOM, only those artifacts produced in the UI layout at the display server level responsive to a browser interpreting the DOM and requesting the OS to present a display. The UI layout might include components that represent things in the DOM, but the DOM is not the UI layout—it is just one form of application UI state that an application might represent by requesting the OS to manipulate the UI layout. In other words, the UI layout is the universal language that different applications (e.g., web browsers, native apps, and the OS itself) use to describe what is shown on the display screen when executing in the OS.

Naively screen scraping, however, presents challenges. Interrogating the entire UI layout is computationally expensive and, if done too frequently, can drain the device's battery or consume too much of the device's memory. For example, fully re-analyzing the entire UI layout in response to every UI event (e.g., change in the UI layout) is generally too power-and-memory intensive for many commercial use cases. Further, screen scraping does not provide explicitly labeled signals designating navigation events (e.g., navigating to a webpage URL). Rather, such events generally need to be inferred from collections of signals that, individually, are not sufficient to infer that such an event has occurred and specify the event.

To mitigate these and other challenges, some embodiments implement a two-phase approach by which 1) a pattern is matched across multiple modalities to determine which UI layout component includes the address bar of the web browser; and 2) that UI component and a particular pattern of signals are monitored to determine when changes in UI state indicate navigation to a new webpage and what is the destination. In some cases, these two phases may each be implemented as a corresponding state machine configured to detect when sufficiently strong indicia have been obtained for the various determinations.

These patterns are particularly challenging to craft because of the risk that other UI changes cause false positives, e.g., indicating that the user has navigated to a URL when in fact they have not. Examples of state changes that need to be distinguished from real navigation events include a user typing in a URL but not hitting enter; a drop-down box appearing on a suggestion UI of the navigation bar with a URL that the user does not suggest; URL's elsewhere in the UI layout (e.g., at links without differing anchor text); a browser launching and loading an initial webpage to which the user did not navigate (like a home page or last page visited), and the like.

Some embodiments may be installed on a mobile computing device or other computing device in advance of the following processes (for instance, more than an hour or week before), e.g., as part of an application (like a native app) downloaded and installed on a mobile device from an online application repository hosted by a provider of mobile operating systems. In some cases, the application (such as processes thereof) may execute as a background process on a mobile computing device. In some case, the application may register a callback function with a framework of the operating system, and the OS may launch the application responsive to a relevant event occurring (e.g., a change in UI state, a change in UI state of specified type, or the OS launching a specified application).

Figure 2:
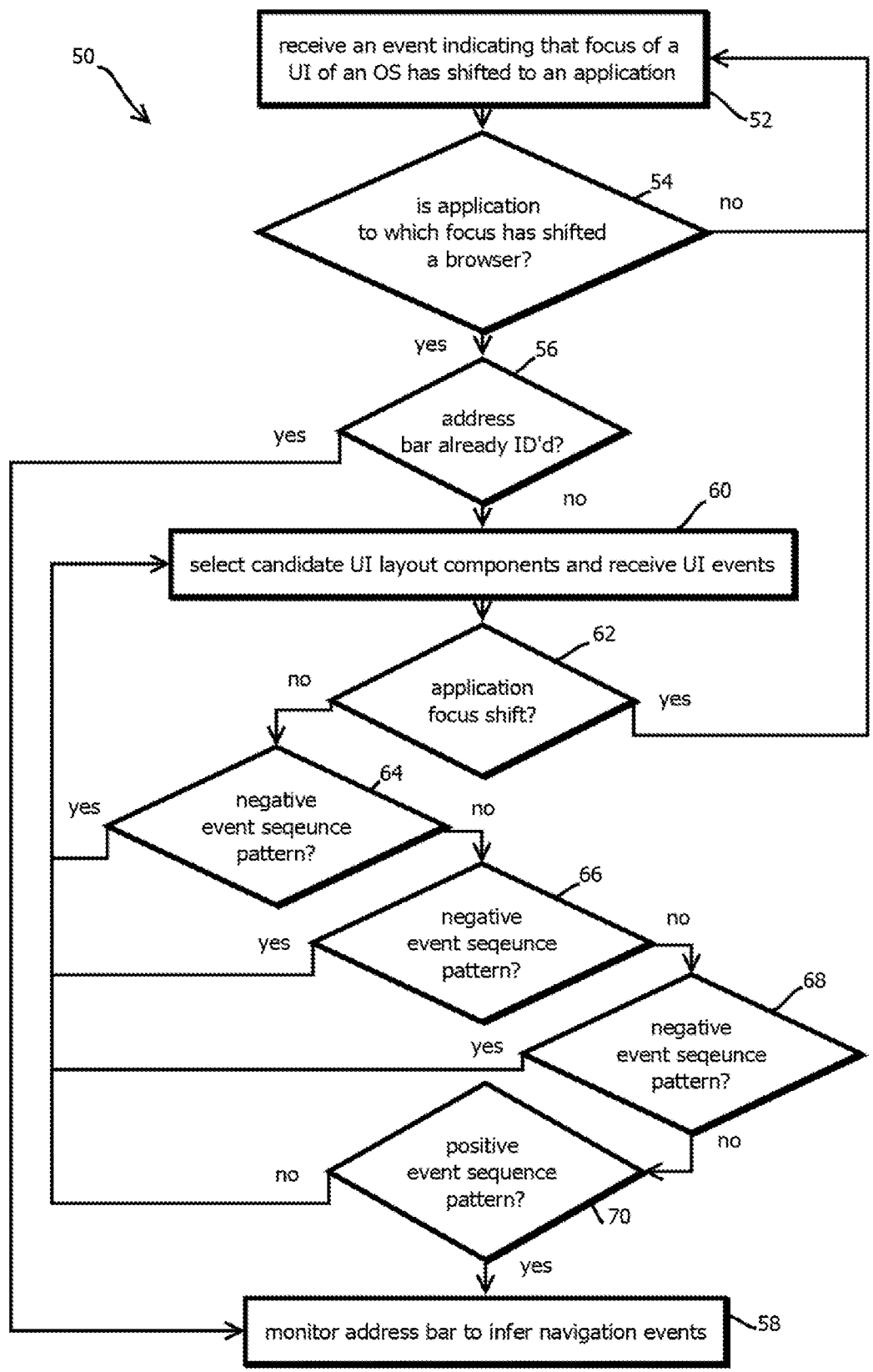
FIG. 2 illustrates an example of a process by which a navigation bar is detected in a UI layout in accordance with some embodiments.

Some embodiments may execute a process (e.g., process 50 shown in FIG. 2) configured to determine which UI layout element is an address bar of a web browser (without the element being labeled as such in a standardized manner across applications). In some cases, this process may include receiving an event indicating that focus of a UI of the OS has shifted to an application (as indicated by block 52) and, then, determining that the application to which focus has shifted is a browser (and not one of a plurality of other applications installed on the mobile device), such as a standalone browser or an instance of a WebView class in a native application (as indicated by block 54). For instance, some embodiments may detect when a browser comes into the foreground of the OS in response to receiving a window state change event from the OS's accessibility API, e.g., by checking that the package name is among the list of packages that are associated with browser type applications.

Upon determining that focus has not shifted to a web browser, in some embodiments, the present process may return to an initial state waiting for an event indicating focus has shifted again.

Alternatively, upon determining that focus has shifted to a browser (e.g., responsive to detecting than application identifier associated with a change of focus event is within a list of browser identifiers in memory), some embodiments may proceed to determine whether a UI layout component (among a plurality of UI layout components of a current UI layout) has been identified as being an address bar of the browser, as indicated by block 56. In some cases, the UI layout component may be identified by a unique identifier of the UI layout, and that unique identifier may be designated in memory as being the address bar (which may include specifying a subset thereof). In some cases, different browsers or instances thereof may present the address bar in a different UI layout component.

Upon determining that the address bar is already identified, embodiments of the present process may terminate, and program flow may proceed to the process described below by which the address bar is monitored to infer navigation events, as indicated by block 58 and described with reference to FIG. 3.

Alternatively, upon determining that the address bar has not been identified (e.g., during a previous session, or for a current version of the browser following an update), some embodiments may proceed to determine which of the UI layout components of the OS's UI is the address bar of the browser, as indicated by block 60. The component may be identified by detecting matches to each of spatial, semantic, and temporal patterns, at least until focus shifts to another application, as indicated by block 62, in which case a current state of pattern matches may be frozen until focus returns or re-initialized when focus returns.

To illustrate the complexity of the problem from perspective of an embodiment, an example encoding of a UI layout is shown below in the following JSON document, which in some cases, may be accessed via the OS's accessibility API. This is a sample of 1 UI layout of a default search engine with the letter "a" typed in the search bar. The JSON document will be populated on the user's input or the web site changing content, and thus, evolves over time from the following snapshot:

{"captureNode":0,"boundsInParent":"Rect(0, 0-1440, 2560)","boundsInScreen":"Rect(0, 0-1440, 2560)","packageName":"com.android.chrome","className": "android.widget.FrameLayout","clickable":false} {"captureNode":0, "boundsInParent":"Rect(0, 96-1440, 2560)", "boundsInScreen":"Rect(0, 96-1440, 2560)","packageName":"com.android.chrome","className": "android.widget.FrameLayout","clickable":false} {"captureNode":0, "boundsInParent":"Rect(0, 320-1440, 2560)","boundsInScreen":"Rect(0, 320-1440, 2560)", "packageName": "com.android.chrome","className": "android.webkit.WebView", "text": "Google", "focusable": true,"clickable": false, "scrollable":true} {"captureNode":0, "boundsInParent": "Rect(0, 320-1440, 324)","boundsInScreen":"Rect(0, 320-1440, 324)","packageName":"com.android.chrome","className":"android.view.View", "viewIdResName":"mnsb","clickable":false} {"captureNode":1,"boundsInParent":"Rect(0, 320-1440, 2196)","boundsInScreen":"Rect(0, 320-1440, 2196)", "packageName":"com.android.chrome","className":"android.view.View","viewIdResName":"gb-main","clickable":false} {"captureNode":1,"boundsInParent":"Rect(0, 320-1440, 324)","boundsInScreen":"Rect(0, 320-1440, 324)","packageName":"com.android.chrome","className":"android.view.View","viewIdResName":"mpd", "clickable":false} {"captureNode":2,"boundsInParent": "Rect(0, 320-1440, 324)","boundsInScreen":"Rect(0, 320-1440, 324)","packageName":"com.android.chrome", "className":"android.view.View","clickable":false} {"captureNode":2,"boundsInParent":"Rect(0, 320-224, 324)","boundsInScreen":"Rect(0, 320-224, 324)","packageName":"com.android.chrome","className":"android.view.View","clickable":false} {"captureNode":2,"boundsInParent":"Rect(0, 320-224, 324)","boundsInScreen":"Rect (0, 320 224,324)", "packageName": "com.android.chrome", "className": "android.widget.Button", "text": "Main menu","focusable":true} {"captureNode":4,"boundsInParent": "Rect(0, 320-680, 324)","boundsInScreen":"Rect(0, 320-680, 324)","packageName":"com.android.chrome", "className":"android.view.View","viewIdResName": "SBmmZd","clickable":false} {"captureNode":4, "boundsInParent":"Rect(224, 320-376, 324)", "boundsInScreen":"Rect(224, 320-376, 324)", "packageName":"com.android.chrome","className": "android.view.View","text":"ALL","focusable":true} {"captureNode":5,"boundsInParent":"Rect(404, 320-648, 324)","boundsInScreen":"Rect(404, 320-648, 324)", "packageName":"com.android.chrome","className":"android.view.View","text":"IMAGES","focusable":true} {"captureNode":7,"boundsInParent":"Rect(676, 320-1440, 324)","boundsInScreen":"Rect(676, 320-1440, 324)", "packageName":"com.android.chrome","className":"android.view.View","viewIdResName":"vLkmZd","clickable":false} {"captureNode":7,"boundsInParent":"Rect (676, 320-1440, 324)","boundsInScreen":"Rect(676, 320-1440, 324)","packageName":"com.android.chrome", "className":"android.view.View","viewIdResName": "gb","clickable":false} {"captureNode":7, "boundsInParent":"Rect(676, 320-1440, 324)", "boundsInScreen":"Rect(676, 320-1440, 324)", "packageName":"com.android.chrome","className": "android.view.View","viewIdResName":"gbw", "clickable":false} {"captureNode":7,"boundsInParent": "Rect(676, 320-1440, 324)","boundsInScreen":"Rect(676, 320-1440, 324)","packageName":"com.android.chrome", "className":"android.view.View","clickable":false} {"captureNode":7,"boundsInParent":"Rect(956, 320-1424, 324)","boundsInScreen":"Rect(956, 320-1424, 324)", "packageName":"com.android.chrome","className":"android.view.View","clickable":false} {"captureNode":7, "boundsInParent":"Rect(956, 320-1132, 324)","boundsInScreen":"Rect(956, 320-1132, 324)","packageName":"com.android.chrome","className":"android.view.View","viewIdResName":"gbwa","clickable":false} {"captureNode":7,"boundsInParent":"Rect(956, 320-1116, 324)","boundsInScreen":"Rect(956, 320-1116, 324)","packageName":"com.android.chrome","className":"android.view.View","clickable":false} {"captureNode":7,"boundsInParent":"Rect(976, 320-1096, 324)","boundsInScreen":"Rect(976, 320-1096, 324)","packageName":"com.android.chrome","className":"android.widget.Button","text":"Google apps","focusable":true} {"captureNode":10,"boundsInParent":"Rect(1132, 320-1392, 324)","boundsInScreen":"Rect(1132, 320-1392, 324)","packageName":"com.android.chrome","className":"android.view.View","text":"Sign in","focusable":true} {"captureNode":17,"boundsInParent": "Rect(0, 320-1440, 2196)","boundsInScreen":"Rect(0, 320-1440, 2196)","packageName":"com.android.chrome","className":"android.view.View","viewIdResName":"n0tgWb","clickable":false} {"captureNode":17,"boundsInParent":"Rect(40, 320-1400, 564)","boundsInScreen":"Rect(40, 320-1400, 564)","packageName":"com.android.chrome","className":"android.view.View","viewIdResName":"ZjJGu","clickable":false} {"captureNode":17,"boundsInParent":"Rect(40, 320-1400, 564)","boundsInScreen":"Rect(40, 320-1400, 564)","packageName":"com.android.chrome","className":"android.view.View","text":"Johann Carl Friedrich Gauß's 241st birthday","focusable":true} {"captureNode":18,"boundsInParent":"Rect(40, 564-1400, 564)","boundsInScreen":"Rect(40, 564-1400, 564)","packageName":"com.android.chrome","className":"android.view.View","viewIdResName":"sDeBje","clickable":false} {"captureNode":20,"boundsInParent":"Rect(0, 596-1440, 2196)","boundsInScreen":"Rect(0, 596-1440, 2196)","packageName":"com.android.chrome","className":"android.view.View","viewIdResName":"main","clickable":false} {"captureNode":20,"boundsInParent":"Rect(32, 596-1408, 1676)","boundsInScreen":"Rect(32, 596-1408, 1676)","packageName":"com.android.chrome","className":"android.view.View","viewIdResName":"tsf","clickable":false} {"captureNode":20,"boundsInParent":"Rect(32, 596-1408, 596)","boundsInScreen":"Rect(32, 596-1408, 596)","packageName":"com.android.chrome","className":"android.view.View","viewIdResName":"tophf","clickable":false} {"captureNode":21,"boundsInParent":"Rect(32, 596-1408, 1676)","boundsInScreen":"Rect(32, 596-1408, 1676)","packageName":"com.android.chrome","className":"android.view.View","clickable":false} {"captureNode":21,"boundsInParent":"Rect(36, 628-1112, 728)","boundsInScreen":"Rect(36, 628-1112, 728)","packageName":"com.android.chrome","className":"android.widget.EditText","text":"a", "focusable":true,"focused":true} {"captureNode":22,"boundsInParent":"Rect(1108, 600-1248, 756)","boundsInScreen":"Rect(1108, 600-1248, 756)","packageName":"com.android.chrome","className":"android.widget.Button","text":"Clear Search","focusable":true} {"captureNode":23,"boundsInParent":"Rect(1248, 596-1408, 756)","boundsInScreen":"Rect(1248, 596-1408, 756)","packageName":"com.android.chrome","className":"android.widget.Button","text":"Google Search","focusable":true} {"captureNode":24,"boundsInParent":"Rect(32, 752-1408, 1676)","boundsInScreen":"Rect(32, 752-1408, 1676)","packageName":"com.android.chrome","className":"android.view.View","clickable":false} {"captureNode":24,"boundsInParent":"Rect(36, 756-1404, 1672)","boundsInScreen":"Rect(36, 756-1404, 1672)","packageName": "com.android.chrome", "className":"android.widget.ListView" } {"captureNode":24,"boundsInParent":"Rect(252, 804-1252, 884)","boundsInScreen": "Rect(252, 804-1252, 884)","packageName": "com.android.chrome","className":"android.view.View", "text":"amazon","focusable":true} {"captureNode":25, "boundsInParent":"Rect(1280, 796-1376, 892)","boundsInScreen":"Rect(1280, 796-1376, 892)","packageName":"com.android.chrome","className": "android.view.View","clickable":fals e} {"captureNode":26,"boundsInParent":"Rect(252, 988-1252, 1068)","boundsInScreen":"Rect(252, 988-1252, 1068)","packageName":"com.android.chrome","className": "android.view.View","text":"avengers infinity war","focusable":true} {"captureNode":27,"boundsInParent": "Rect(1280, 980-1376, 1076)","boundsInScreen":"Rect (1280, 980-1376, 1076)","packageName": "com.android.chrome","className":"android.view.View", "clickable":fa lse} {"captureNode":28,"boundsInParent": "Rect(252, 1172-1252, 1252)","boundsInScreen":"Rect (252, 1172-1252, 1252)","packageName":"com.android.chrome","className":"android.view.View", "text":"american idol","focusable":true} {"captureNode":29,"boundsInParent":"Rect(1280, 1164-1376, 1260)","boundsInScreen":"Rect(1280, 1164-1376, 1260)","packageName":"com.android.chrome","className": "android.view.View","clickable":fa lse} {"captureNode":30,"boundsInParent":"Rect(252, 1356-1252, 1436)","boundsInScreen":"Rect(252, 1356-1252, 1436)","packageName":"com.android.chrome","className": "android.view.View","text":"avengers","focusable":true} {"captureNode":31,"boundsInParent":"Rect(1280, 1348-1376, 1444)","boundsInScreen":"Rect(1280, 1348-1376, 1444)","packageName":"com.android.chrome","className":"android.view.View","clickable":fa lse} {"captureNode":32,"boundsInParent":"Rect(252, 1540-1252, 1620)","boundsInScreen":"Rect(252, 1540-1252, 1620)","packageName":"com.android.chrome","className":"android.view.View","text":"airbnb", "focusable":true} {"captureNode":33,"boundsInParent":"Rect(1280, 1532-1376, 1628)","boundsInScreen":"Rect(1280, 1532-1376, 1628)","packageName":"com.android.chrome","className":"android.view.View","clickable":false} {"captureNode":35, "boundsInParent":"Rect(36, 744-1404, 748)","boundsInScreen":"Rect(36, 744-1404, 748)","packageName":"com.android.chrome","className": "android.view.View","clickable":false} {"captureNode": 38,"boundsInParent":"Rect(32, 744-1408, 748)","boundsInScreen":"Rect(32, 744-1408, 748)","packageName":"com.android.chrome","className": "android.view.View","clickable":false} {"captureNode": 40,"boundsInParent":"Rect(32, 1728-364, 2000)","boundsInScreen":"Rect(32, 1728-364, 2000)","packageName":"com.android.chrome","className": "android.view.View","text":"Weather","focusable":true} {"captureNode":41,"boundsInParent":"Rect(380, 1728-712, 2000)","boundsInScreen":"Rect(380, 1728-712, 2000)","packageName":"com.android.chrome","className":"android.view.View","text":"Sports", "focusable":true} {"captureNode":42,"boundsInParent":"Rect(728, 1728-1060, 2000)","boundsInScreen":"Rect(728, 1728-1060, 2000)","packageName":"com.android.chrome","className":"android.view.View","text":"Entertainment","focusable":true} {"captureNode":43,"boundsInParent":

"Rect(1076, 1728-1408, 2000)","boundsInScreen":"Rect (1076, 1728-1408, 2000)","packageName": "com.android.chrome","className":"android.view.View", "text":"Restaurants","focusable":true} {"captureNode":44, "boundsInParent":"Rect(0, 2096-1440, 2196)", "boundsInScreen":"Rect(0, 2096-1440, 2196)", "packageName":"com.android.chrome","className": "android.view.View","viewIdResN ame":"belowsb", "clickable":false} {"captureNode":47,"boundsInParent": "Rect(-60, 892-1392, 892)","boundsInScreen":"Rect(-60, 892-1392, 892)","packageName":"com.android.chrome", "className":"android.view.View","viewIdResNa me": "footer","clickable":false} {"captureNode":47,"boundsInParent":"Rect(-60, 1544-1392, 1544)","boundsInScreen": "Rect(-60, 1544-1392, 1544)","packageName": "com.android.chrome","className":"android.view.View", "viewIdResN ame":"fbar","clickable":false} {"captureNode":47,"boundsInParent":"Rect(-60, 2196-1392, 2196)","boundsInScreen":"Rect(-60, 2196-1392, 2196)", "packageName": "com.android.chrome","className": "android.view.View","clickable":fa lse} {"captureNode":51,"boundsInParent":"Rect(0, 2196-1440, 2380)","boundsInScreen":"Rect(0, 2196-1440, 2380)", "packageName": "com.android.chrome","className": "android.view.View", "clickable":fa lse} {"captureNode": 51,"boundsInParent":"Rect(248, 2240-552, 2380)","boundsInScreen":"Rect(248, 2240-552, 2380)", "packageName": "com.android.chrome","className": "android.view.View", "clickable":fa lse} {"captureNode":51,"boundsInParent": "Rect(248, 2280-552, 2340)","boundsInScreen":"Rect(248, 2280-552, 2340)", "packageName": "com.android.chrome", "className": "android.widget.Button", "text": "Set tings", "viewIdResName":"fsettl","focusable":true} {"captureNode":53,"boundsInParent":"Rect(5 48, 2280-828, 2340)","boundsInScreen":"Rect(548, 2280-828, 2340)", "packageName": "com.android.chrome","className": "android.view.View", "text": "Privacy","focusable":true} {"captureNode":54,"boundsInParent":"Rect(824, 2280-1084, 2340)","boundsInScreen":"Rect(824, 2280-1084, 2340)", "packageName": "com.android.chrome","className": "android.view.View", "text": "Terms", "focusable": true} {"captureNode":56,"boundsInParent":"Rect(0, 2380-1440, 2520)","boundsInScreen":"Rect(0, 2380-1440, 2520)", "packageName": "com.android.chrome","className": "android.view.View", "clickable":fa lse} {"captureNode":56,"boundsInParent":"Rect(196, 2420-572, 2480)","boundsInScreen":"Rect(196, 2420-572, 2480)", "packageName": "com.android.chrome", "className": "android.view.View", "text": "Advertising","focusable": true} {"captureNode":57,"boundsInParent":"Rect(568, 2420-888, 2480)","boundsInScreen":"Rect(568, 2420-888, 2480)", "packageName": "com.android.chrome","className": "android.view.View", "text":"Business","focusable":true} {"captureNode":58,"boundsInParent":"Rect (884, 2420-1136, 2480)","boundsInScreen":"Rect(884, 2420-1136, 2480)", "packageName": "com.android. chrome", "className": "android.view.View", "text": "About", "focusable":true} {"captureNode":60,"boundsInParent":"Rect(0, 2556-1440, 2560)","boundsInScreen": "Rect(0, 2556-1440, 2560)", "packageName": "com.android.chrome", "className": "android.view.View", "clickable":fa lse} {"captureNode":61,"boundsInParent": "Rect(0, 2556-1440, 2560)","boundsInScreen":"Rect(0, 2556-1440, 2560)","packageName":"com.android. chrome","className":"android.view.View","viewIdResN ame":"xjsd","clickable":false} {"captureNode":62,"boundsInScreen": "Rect(0, 2556-1440, 2560)","boundsInScreen": "Rect(0, 2556-1440, 2560)","packageName":"com.android. chrome","className":"android.view.View","viewIdResN ame":"xjsi","clickable":false} {"captureNode":63,"boundsInParent": "Rect(0, 2556-1440, 2560)","boundsInScreen": "Rect(0, 2556-1440, 2560)", "packageName": "com.android.chrome", "className":"android.view.View", "clickable":false} {"captureNode":66,"boundsInParent": "Rect(0, 96-192, 320)","boundsInScreen":"Rect(0, 96-192, 320)","packageName":"com.android.chrome","className":"android.widget.ImageButton","contentDescription":"Home","focusable":true,"longClickable":true} {"captureNode":67,"boundsInParent":"Rect(200, 96-1040, 320)","boundsInScreen":"Rect(200, 96-1040, 320)", "packageName":"com.android.chrome","className":"android.widget.FrameLayout","clickable":false} {"captureNode":67,"boundsInParent":"Rect(208, 104-336, 308)", "boundsInScreen":"Rect(208, 104-336, 308)", "packageName": "com.android.chrome", "className": "android.widget.ImageButton","contentDescription":"Site information", "focusable":true} {"captureNode":68, "boundsInParent": "Rect(336, 116-1032, 296)","boundsInScreen":"Rect(336, 116-1032, 296)","packageName":"com.android.chrome","className":"android.widget.EditText","text":"https:Wwww.google.com", "focusable":true, "longClickable":true}

Over time, the UI layout may change (e.g., what is shown, what is selected, or what carries the focus), and those changes may be signaled by a stream of UI layout events received by some embodiments. In some cases, each change may have a corresponding event. An example of various event streams produced by various user actions is reproduced below. In some cases, user actions produce a sequence of events that are indicative of which UI layout component is the address bar (along with other parameters from the UI layout), and in some cases, user actions produce similar sequences of events that do not reliably indicate the identity of an address bar in the UI layout. Example event sequences are presented below for each of the following actions, the last of which may produce events in its event sequence reliably tied to the address bar:

User opens browser application
    User starts typing into website's search bar, not browser's address bar
    User puts keyboard down
    User clicks search box
    User enters valid URL in search box
    User closes keyboard (doesn't search for search box URL)
    User presses search button to go to URL In this case each action led to an event that may appear in the event stream ingested by some embodiments. Each event may produce some elements with the same or changed data. This data may contain the URL of the address bar or may not. Using a combination of UI layout elements along with events will deduct what element is the address bar compared to search bar or another false positive. Events may include properties, such as getSource by which the UI layout component giving rise to the event is identified.

Events received by embodiments from the OS in virtue of the "User opens browser application with default search engine" include:
    window_state_change
    view_focus
    keyboard_up Events received by embodiments from the OS in virtue of the "User starts typing into website's search bar, not browser's address bar" include:

text_changed type_view_focused from suggestive dropdown (dependent on browser application)

Events received by embodiments from the OS in virtue of the "User puts keyboard down" include:

keyboard down type_view_focus

Received events often include type_view_focus events, and some may contain a URL that appears to be valid and might trigger a false positive in more naïve approaches. But because the user need not actually visit the URL, and may have instead only searched for that URL, the UI's layout, in isolation, does not reliably indicate the address bar. Thus, handling cases like this is relevant to capturing accurate (e.g., actually visited, or indicative of an address bar rather than a link) URLs. Some embodiments reduce such false positives by detecting a combination of changes to the UI layout's value and events, such as the events described in this example.

Events received by embodiments from the OS in virtue of the "User clicks search box" include:

type_view_focus

Events received by embodiments from the OS in virtue of the "User closes keyboard (doesn't search for search box URL)" include:

keyboard down

These signals are relevant to obtaining accurate ((e.g., actually visited, or indicative of an address bar rather than a link) URLs in some embodiments, as there may be multiple URLs in the UI's layout, only some of which are actually visited, and only some of which are in an address bar. Thus, some embodiments apply criteria that detect combinations of layout elements and events to infer that at least some UI layout components with URLs are not the address bar.

Events received by embodiments from the OS in virtue of the "User presses search button to go to URL" include:

type_view_focus

This is an example of an event where the address bar may be found, e.g., by using the combinations of layout elements and events to confirm this is the address bar and not a false positive like the previous events. Some embodiments may detect both that this event pattern is present and that the above event patterns potentially giving rise to false positives are not present, e.g., by currently matching an event stream to a plurality of positive-patterns (as indicated by block 70) and negative-patterns (as indicated by blocks 64, 66, and 68), for instance with a plurality of state machines, one for each pattern. In some cases, patterns may be matched on a UI layout component-by-UI layout component basis, with some events mapping to every ongoing pattern match and some being specific to individual UI layout component candidate pattern matches.

Selecting which UI layout component is the address bar can be challenging for the reasons described above. Naively matching a regex for valid URL's is not reliable because URLs can appear in the UI for a variety of reasons other than navigation events. Filtering such URL's based on their location on the screen is not necessarily reliable because some mobile OS's support concurrent displays of different applications on different panes or tiles and because URLs can appear in the UI in the location of the address bar that are not part of the address bar (e.g., URL completion suggestions in a drop down represented in UI layout components inserted into the UI layout by the browser).

Some embodiments may select a subset of the UI layout components as candidate address bar components by selecting the first textbox UI element of the UI layout after the above noted determination that focus has shifted to a browser. In some cases, the subset may be displayed concurrently, or (i.e., and/or) candidates may be added to the subset over time, e.g., as the UI layout evolves. Some embodiments may initialize the subset to a null set, traverse the UI layout, e.g., with a depth first or breadth first recursive search, or set of searches performed responsive to UI layout events satisfying various criteria, and add candidates to the subset responsive to determining that properties of the current UI layout element in a traversal meet various criteria, e.g., being a textbox UI element. Some embodiments may select as the subset a threshold amount, e.g., the first one, or first five, encountered in a traversal beginning with a root node of the UI layout.

In some embodiments, the criteria for selecting the subset may be determined based on a type of browser too which focus has shifted. Some embodiments may maintain in memory criteria associated with different browsers (e.g., with identifiers of those browsers). Upon determining that focus has shifted to one of these browser, e.g., responsive to a window state change event, the criteria may be accessed in memory based on an identifier of the browser in the event indicating the shift in focus, and those accessed criteria may be applied in selection of the sub set.

In some embodiments, after, before, or in order to facilitate obtaining the subset of UI layout component candidates, some embodiments may monitor subsequent UI events until a focus event is detected. In some cases, the recipient of the focus event may be added to the subset if the recipient is a textbox. Or in some cases, a candidate may be selected from the subset upon determining that the candidate has received the focus event. In some cases, the subset may include both the address bar and various other text box inputs of a webform. So, distinguishing the address bar at the UI layout layer is non-trivial, as these candidates may appear indistinguishable absent certain patterns in usage.

Some embodiments may then determine whether the selected candidate receives text input that qualifies as a valid uniform resource locator (or other URI). Some embodiments may compare an accumulated string after each character of entered text to a regular expression configured to indicate whether the string is a valid URL. Examples include the following regular expression: (http|ftp|https)://([\w_-]+(?:(?:\.[\w_-]+)+))([\w.,@?^=%&:/~+#-]*[\w@?^=%&/~+#-])? Or some embodiments may apply the regex to the accumulated text after some other event, e.g, in response to a subsequent view focus event occurring upon the user submitting the string. Or some embodiments may wait until the string remains unmodified for more than a threshold amount of time before applying the regex to the string.

Upon determining that the string is not a valid URL, some embodiments may return to the previous state and continue monitoring for events by which another candidate may be selected from the subset of UI layout components. Alternative, upon determining that the string is a valid URL, some embodiments may select the candidate from among the subset and proceed to confirm that the selected candidate is likely to be the address bar. In some cases, the selection may be confirmed in response to detecting a subsequent view focus event within a threshold duration of time, before some other event occurs, before a window state change event occurs, or a combination thereof. Some embodiments may do a second-stage confirmation by verifying that the string that matched the pattern is still in the same UI layout component after the subsequent event (e.g., in a UI layout component having the same unique identifier, in a same position on a display screen, or within a same parent UI layout element).

In some embodiments, the above-described process may be restarted responsive to certain events, e.g., a reboot, a window state change event indicates the browser has closed and restarted, or the like.

Upon confirming the identifier of the address bar, some embodiments may associate the identifier of the address bar in memory in association with the identifier of the browser received with the window state change event. Some embodiments may make an API call to the OS to determine if the previously identified address bar element is refreshed or if it is, instead, obsolete, in which case the identifier of the UI element may be removed or designated in memory as not reliably indicating the location of the address bar in the UI layout, and embodiments may re-execute the process above to re-detect the UI layout component include the address bar. An example, is the memory address of the UI layout element's (also called a component) object, which embodiments may reference when the address bar is identified. Then on each event we use the provided function refresh, to determine if the value changed or if the value is obsolete. In some cases, this record may be accessed responsive to subsequent window state change events, and the address bar may be identified based on the stored record.

Some embodiments may then execute a second process to track web navigation events (e.g., successfully executed URL requests; request and responses; requests and completed responses; requests and completed responses that are resident on a display for more than threshold amount of time; or requests and completed responses with which the user interacts (e.g., by touching or scrolling).

Some embodiments may filter subsequent event streams to select those event streams in which the identified UI layout component is specified in a view focus event. After such an event, and before a different component receives such a view focus event, some embodiments may apply the above-described techniques to determine when a valid URL has been entered. In some cases, event with the address bar identified, it is a non-trivial problem to detect when an actual navigation event has occurred, as the user may enter a URL and not submit it before editing the URL. Accordingly, upon detecting a valid URL, some embodiments may confirm that the URL is associated with a web navigation event by monitoring subsequent events and UI layout changes to confirm that the user likely navigated to the URL. To this end, some embodiments may determine whether a view focus event is received that the URL is still resident in the address bar, indicating a likely load of a new webpage at the URL. Handling corner cases is relevant to obtaining accurate reports of visited URLs, e.g., handling the keyboard down event is relevant to determine if a URL is valid when a view focus event occurs. View focus events may occur on UI elements that are not the address bar, and the keyboard down event combined with UI element changes and text changed event, described in the above example, prevents or reduces the likelihood of false-positive URLs being collected, e.g., by filtering out view focus events that are not preceded by a keyboard down event and text changed event.

Some embodiments may further verify this web focus event by querying network usage statistics of the OS before and after the view focus event to determine whether an amount of network traffic in the interim is greater than a threshold and likely indicative of a navigation event. That said, some embodiments may operate without particularly granular access to network traffic, and some web pages may cause a relatively high bandwidth of network traffic even in the absence of a navigation event, e.g., refreshing loaded ads and reporting page metrics. According, it is expected that the network usage may be, at most, a confirmation to other more reliable signals.

Some embodiments may accumulate network navigation events in a log on the mobile device. Some embodiments may report the log contents to a central server, e.g., periodically, after every event, or responsive to more than a threshold of unreported events accumulating. Some embodiments may filter web navigation events in the log and report back to the central server only those meeting certain criteria. In some cases, the web navigation log may include a plurality of log entries, each having a timestamp, an URL, an amount of time spent at the URL, metrics indicative of user engagement at the UR (e.g., count or rate of user interaction events before a subsequent web navigation event), a URL from which the user navigated to the URL, and a URL to which the user navigated after. Entries may also include other context, like a user's geolocation obtained by querying a geolocation framework of the OS and a type of network connection in use (e.g., cellular or WIFI).

In some cases, the reported log entries may be received at the server in association with unique identifiers of the users (e.g., of their mobile device, or of a user who is associated with multiple such devices). In some cases, the user identifier may be anonymized. Some embodiments may store the received records in user profiles server-side. Some embodiments may receive such log entries from a relatively large number of users, such as more than 10,000, more than 100,000, more than one million, more than ten million, or more than 100 million users, over a relatively large are (like more than 10,000 square miles, such as the US, North America, or the world). In some cases, log events may be received at a relatively high rate, like more than 100 per second, more than 1,000 per second, or more than 10,000 per second.

Figure 3:
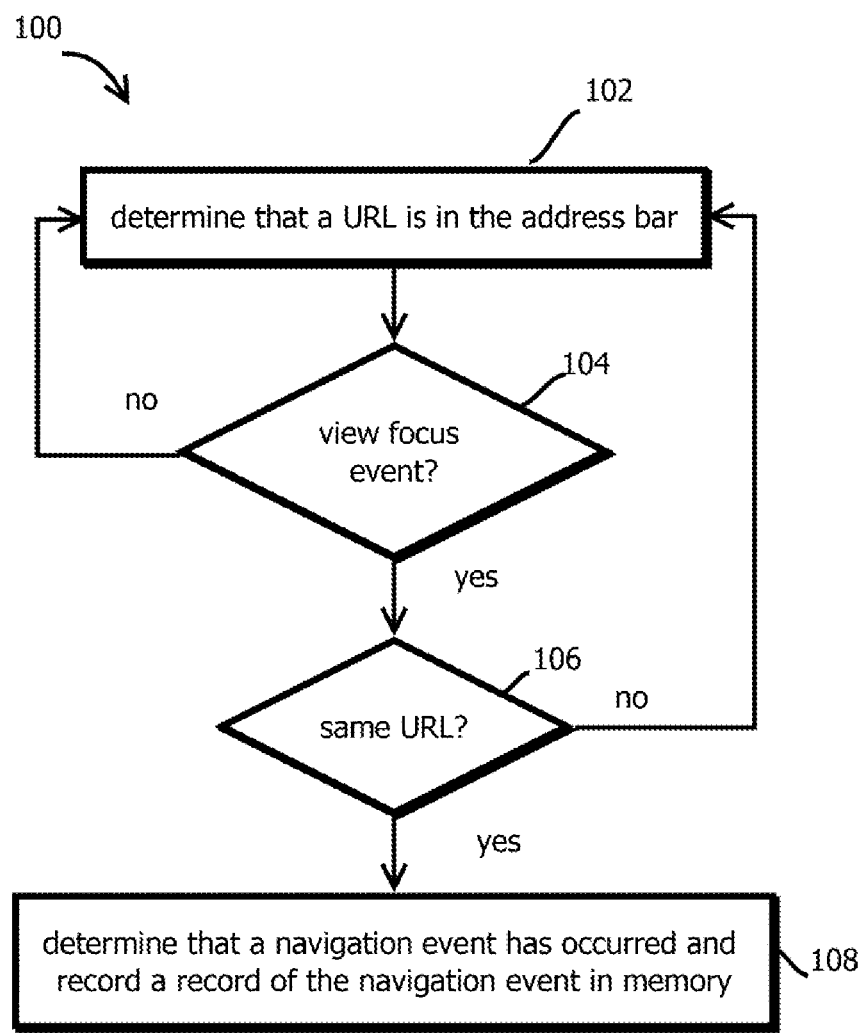
FIG. 3 illustrates an example of a process by which navigation actions are detected in a navigation bar in accordance with some embodiments.

FIG. 3 illustrates an example of a process 100 to monitor a previously identified address bar to infer navigation events. As noted, simply detecting the presence of a well-formed URL in the address bar is a probative, but not conclusive (in some embodiments), indication that the URL was visited (e.g., the mobile device requested content from the URL, received the content, and rendered the content, for instance displaying the content for more than a threshold duration of time). To mitigate such false positives, some embodiments may apply multi-modal pattern matches to both text of the address bar and sequences of UI events that are indicative of navigation events. For instance, some embodiments may determine that a URL is in the address bar (as indicated by block 102), for instance by matching text of the URL to a regular expression, for example, responsive to a UI event indicative that a character was entered, responsive to a UI event indicating that focus changed to a different UI layout component, responsive to a UI event (or more than a threshold amount thereof) indicating a new web document is loaded, or responsive to a keyboard down event. Some embodiments may determine whether, after detecting the valid URL in the address bar, a view focus event is received (as indicated by block 104), indicating a page reload (e.g., without receiving an event indicating the application lost the focus). Some embodiments may determine whether the same URL, or a canonical variant thereof, is still present after the page load (as indicated by block 106) and, in response, determine that a navigation event has occurred and record a record of the navigation event in memory. The record may include, e.g., a time-stamped record of the URL, URL from which the user navigated, a URL to which the user subsequently navigates, screen dwell times associated with elements of the web page (e.g., a screen dwell time of each element in a document object model), dwell time at the URL, a and geolocation of the user indicated by querying a geolocation framework or library of an operating system of the mobile device. In some cases, the records may be reported as metrics to a remote server, as described above, or aggregate metrics may be determined client side and reported.

Figure 4:
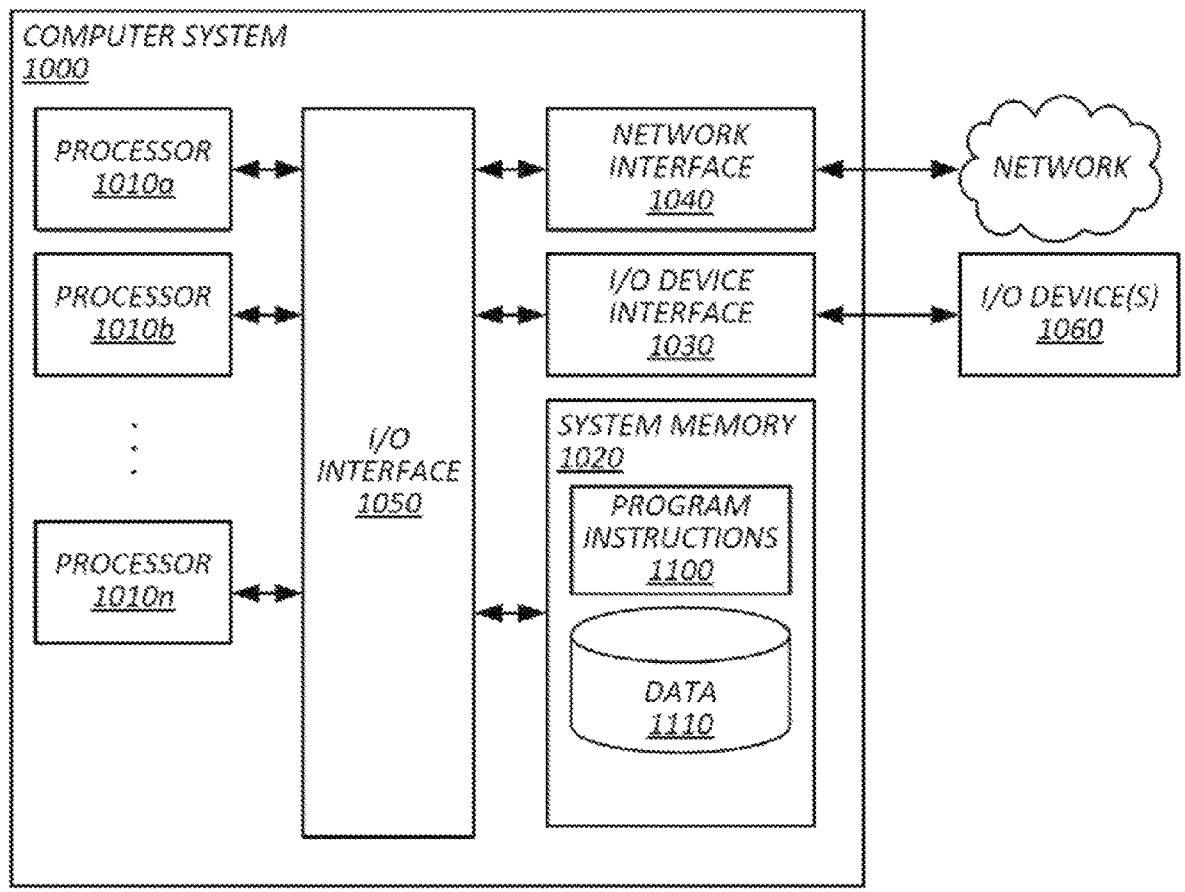
FIG. 4 illustrates an example of a computing device on which components of the present techniques may execute.

FIG. 4 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A tangible, non-transitory, machine-readable medium storing instructions that when executed by one or more processors effectuate operations comprising: executing, on a mobile computing device, a monitoring service configured to communicate with an accessibility application program interface (API) of an operating system of a mobile computing device, wherein: the accessibility API reports state of a user interface (UI) layout displayed by the mobile computing device to the monitoring service, the accessibility API reports UI events indicative of changes in the UI layout to the monitoring service, and the monitoring service executes in one or more processes that are different from processes of at least some applications monitored by the monitoring service on the mobile computing device; receiving, with the monitoring service, a first UI event indicating focus of the UI has shifted to a first application; in response to receiving the first UI event, with the monitoring service, based on parameters of the first event, determining that the first application is an instance of a web browser; in response to determining that the first application is an instance of a web browser, with the monitoring service, selecting a first UI layout component as including a web-browser address bar of the first application from among a plurality of UI layout components of a UI layout of the first application, wherein: the selected first UI layout component is selected based on both detecting a pattern of UI events in a sequence of events received by the monitoring service from the operating system and an attribute of the selected first UI layout component, and the pattern of UI events includes at least one UI event indicative of a user interaction and having a UI event parameter that associates the event with the selected first UI layout component; storing, in memory accessible to the monitoring service, an identifier of the selected UI layout component in association with the first application to indicate that the selected UI layout component includes the web-browser address bar of the first application.

2. The medium of embodiment 1, wherein: code of the monitoring service is installed on the mobile computing device more than an hour before being executed; the accessibility API reports state of a user interface UI layout displayed by the mobile computing device in a standardized format across a plurality of different types of applications executable on the mobile computing device, at least some of the plurality of different types of applications being applications that are not web browsers; the UI layout includes a hierarchical arrangement of UI layout components; the UI layout is distinct from a document object model of a web document in program state of a web browser; and the monitoring service is assigned a different virtual memory address space by the operating system than the first application;

3. The medium of any one of embodiments 1-2, wherein the operations comprise: receiving a second event indicating that focus of the UI layout has shifted to a second application, different from the first application; in response to receiving the second event, determining that the second application includes a web browser; in response to determining that the second application is a web browser, determining that a designated UI layout component of a UI layout of the second application including a plurality of UI layout elements is designated in memory as having an address bar of the second application in virtue of previously designating the designated UI layout component with the monitoring process; and in response to determining that the designated UI layout component is designated as having the address bar of the second application, comparing a subsequent sequence of events from the accessibility API to detect a navigation pattern, the navigation pattern specifying at least some events that have an event parameter identifying the designated UI layout component.

4. The medium of any one of embodiments 1-3, wherein: UI layout components of the UI layout of the first application change while selecting a UI layout component from among a plurality of UI layout components such that some UI layout components are added and some UI layout components are removed between when the first application is determined to be a web browser and when the UI layout component is selected.

5. The medium of any one of embodiments 1-4, wherein: the selected first UI layout component is selected based on detecting both a positive pattern of UI events and determining that a negative pattern of UI events has not been received by the monitoring service during at least some portion of a sequence of events that satisfies the positive pattern of UI events.

6. The medium of any one of embodiments 1-5, wherein: the pattern of UI events specifies a sequence of UI events including a type_view_focused event.

7. The medium of any one of embodiments 1-6, wherein: the pattern of UI events specifies a sequence of UI events including a keyboard down event.

8. The medium of any one of embodiments 1-7, wherein: the pattern of UI events specifies a sequence of UI events including a type_view_focused event; and the pattern of UI events specifies a sequence of UI events including a keyboard down event.

9. The medium of any one of embodiments 1-8, wherein: the pattern of UI events specifies a sequence of UI events including a text changed event.

10. The medium of any one of embodiments 1-9, wherein: the pattern of UI events specifies a sequence of UI events including: a type_view_focused event; a keyboard down event; and a text changed event; and the pattern of UI events specifies that a parameter of the type_view_focused event must identify the same UI layout component as a parameter of the text changed event.

11. The medium of any one of embodiments 1-10, wherein: the selected first UI layout component is selected based the selected first UI layout component having an attribute indicating the selected first UI layout component is configured to receive user-input text.

12. The medium of any one of embodiments 1-11, wherein: the selected first UI layout component is selected upon determining that text entered into the selected first UI layout component matches to a regular expression that detects uniform resource identifiers.

13. The medium of any one of embodiments 1-12, wherein: the pattern of UI events specifies a sequence of UI events including: a type_view_focused event; a keyboard down event; and a text changed event; the pattern of UI events specifies that a parameter of the type_view_focused event must identify the same UI layout component as a parameter of the text changed event; the selected first UI layout component is selected based the selected first UI layout component having an attribute indicating the selected first UI layout component is configured to receive user-input text; and the selected first UI layout component is selected upon determining that text entered into the selected first UI layout component matches to a regular expression that detects uniform resource identifiers.

14. The medium of any one of embodiments 1-13, wherein: selecting the first UI layout component is done in response to determining that the selected first UI layout component is not already associated in memory of the monitoring application with the first application.

15. The medium of any one of embodiments 1-14, wherein the operations comprise: determining, with the monitoring application, to not select a second UI layout component of the first application that includes text of a uniform resource identifier based on the second UI layout component being associated with a sequence of UI events received by the monitoring application from the operation system that satisfy a negative pattern of UI event sequences.

16. The medium of any one of embodiments 1-15, wherein the operations comprise: detecting a sequence of web addresses visited by the first application based on text in UI layout components of the first application identified based on the identifier of the selected first UI layout component stored in memory.

17. The medium of embodiment 16, wherein: detecting the sequence of web addresses comprises: determining that a first uniform address locator was entered into the web-browser address bar and that the first application visited a first website specified by the first uniform address locator; and determining that a second uniform address locator was entered into the web-browser address bar and that the first application did not visit a second web site specified by the second uniform address locator; and the first application is determined to have visited the first website but not the second because a difference in UI event sequences.

18. The medium of embodiment 16, wherein the operations comprise: reporting, with the monitoring service, one or more metrics based on the sequence of web addresses to a remote server; and receiving metrics indicative of visited web addresses from more than 1,000 mobile computing devices executing respective instances of the monitoring service with the remote server.

19. A tangible, non-transitory, machine-readable medium storing instructions that wen executed by one or more processors effectuate operations, comprising: receiving, with one or more processors, with an observer application executing on a mobile computing device, a callback event indicative of a user input for an observed application executing on the mobile computing device; determining, with one or more processors, that the callback event satisfies an event filter with the observer application; requesting, with one or more processors, with the observer application, from an accessibility service application program interface of an operating system of the mobile computing device, window content of a window presented on a display screen of the mobile computing device by an observed application rendering content from a remote content server and obtained in encrypted format from the remote content server; receiving, with one or more processors, with the observer application, structured data including at least one visual element displayed on the display screen; and sending data indicative of consumer usage of the mobile computing device to a remote analysis server based on the received structured data.

20. A method, comprising: the operations of any one of embodiments 1-19.

21. A system, comprising: one or more processors; and memory storing instructions that when executed by the processors cause the processors to effectuate operations comprising: the operations of any one of embodiments 1-19.

What is claimed is:

1. A tangible, non-transitory, machine-readable medium storing instructions that when executed by one or more processors effectuate operations comprising:
executing, on a mobile computing device, a monitoring service configured to communicate with an accessibility application program interface (API) of an operating system of a mobile computing device, wherein:
the accessibility API reports state of a user interface (UI) layout displayed by the mobile computing device to the monitoring service,
the accessibility API reports UI events indicative of changes in the UI layout to the monitoring service, and
the monitoring service executes in one or more processes that are different from processes of at least some applications monitored by the monitoring service on the mobile computing device;
receiving, with the monitoring service, a first UI event indicating focus of the UI has shifted;
in response to receiving the first UI event, determining with the monitoring service, based on parameters of the first UI event, whether focus of the UI shifted to an application including web browser functionality;
in response to determining that focus of the UI shifted to a first application that is an instance of a web browser, receiving with the monitoring service, at least some UI events associated with UI layout components of the first application;
determining, with the monitoring service, to select a first UI layout component of the first application as including a web-browser address bar from among a plurality of UI layout components of a UI layout of the first application based on the received UI events, wherein:
the first UI layout component is selected based on both detecting a pattern of UI events in a sequence of events received by the monitoring service from the operating system and an attribute of the first UI layout component, and
the pattern of UI events includes at least one UI event indicative of a user interaction and having a UI event parameter that associates the event with the first UI layout component; and
storing, in memory accessible to the monitoring service, an identifier of the first UI layout component in association with the first application to indicate the selection of the first UI layout component as including the web-browser address bar of the first application.

2. The medium of claim 1, wherein:
code of the monitoring service is installed on the mobile computing device more than an hour before being executed;
the accessibility API reports state of a user interface UI layout displayed by the mobile computing device in a standardized format across a plurality of different types of applications executable on the mobile computing device, at least some of the plurality of different types of applications being applications that are not web browsers;
the UI layout includes a hierarchical arrangement of UI layout components;
the UI layout is distinct from a document object model of a web document in program state of a web browser; and
the monitoring service is assigned a different virtual memory address space by the operating system than the first application.

3. The medium of claim 1, wherein the operations comprise:
receiving a second event indicating that focus of the UI has shifted;
in response to receiving the second event, determining with the monitoring service, based on parameters of the second event, whether focus of the UI shifted to an application including web browser functionality, wherein the application is a second application, different from the first application, that includes a web browser;
in response to determining that the second application includes a web browser, determining that a designated UI layout component of a UI layout of the second application including a plurality of UI layout elements is designated in memory as having an address bar of the second application in virtue of previously designating the designated UI layout component with the monitoring process; and
in response to determining that the designated UI layout component is designated as having the address bar of the second application, comparing a subsequent sequence of events from the accessibility API to detect a navigation pattern, the navigation pattern specifying at least some events that have an event parameter identifying the designated UI layout component.

4. The medium of claim 1, wherein:
at least some UI layout components of the UI layout of the first application change while determining whether to select the first UI layout component from among a plurality of UI layout components such that some UI layout components are added and some UI layout components are removed between when the first application is determined to be a web browser and when the first UI layout component is determined to be selected.

5. The medium of claim 1, wherein:
the first UI layout component is selected based on detecting both a positive pattern of UI events and determining that a negative pattern of UI events has not been received by the monitoring service during at least some portion of a sequence of events that satisfies the positive pattern of UI events.

6. The medium of claim 1, wherein:
the pattern of UI events specifies a sequence of UI events including a type_view_focused event.

7. The medium of claim 1, wherein:
the pattern of UI events specifies a sequence of UI events including a keyboard down event.

8. The medium of claim 1, wherein:
the pattern of UI events specifies a sequence of UI events including a type_view_focused event; and
the pattern of UI events specifies a sequence of UI events including a keyboard down event.
9. The medium of claim 1, wherein:
the pattern of UI events specifies a sequence of UI events including a text changed event.
10. The medium of claim 1, wherein:
the pattern of UI events specifies a sequence of UI events including:
a type_view_focused event;
a keyboard down event; and
a text changed event; and
the pattern of UI events specifies that a parameter of the type_view_focused event must identify the same UI layout component as a parameter of the text changed event.
11. The medium of claim 1, wherein:
the first UI layout component is selected based on the first UI layout component having an attribute indicating the first UI layout component is configured to receive user-input text.
12. The medium of claim 1, wherein:
the first UI layout component is selected upon determining that text entered into the first UI layout component matches to a regular expression that detects uniform resource identifiers.
13. The medium of claim 1, wherein:
the pattern of UI events specifies a sequence of UI events including:
a type_view_focused event;
a keyboard down event; and
a text changed event;
the pattern of UI events specifies that a parameter of the type_view_focused event must identify the same UI layout component as a parameter of the text changed event;
the first UI layout component is selected based on the first UI layout component having an attribute indicating the first UI layout component is configured to receive user-input text; and
the first UI layout component is selected upon determining that text entered into the first UI layout component matches to a regular expression that detects uniform resource identifiers.
14. The medium of claim 1, wherein:
selecting the first UI layout component is done in response to determining that the first UI layout component is not already associated in memory of the monitoring application with the first application.
15. The medium of claim 1, wherein the operations comprise:
determining, with the monitoring application, to not select a second UI layout component of the first application that includes text of a uniform resource identifier based on the second UI layout component being associated with a sequence of UI events received by the monitoring application from the operating system that satisfy a negative pattern of UI event sequences.
16. The medium of claim 1, wherein the operations comprise:
detecting a sequence of web addresses visited by the first application based on text in UI layout components of the first application identified based on the identifier of the selected first UI layout component stored in memory.

17. The medium of claim 16, wherein:
detecting the sequence of web addresses comprises:
determining that a first uniform address locator was entered into the web-browser address bar and that the first application visited a first website specified by the first uniform address locator; and
determining that a second uniform address locator was entered into the web-browser address bar and that the first application did not visit a second website specified by the second uniform address locator; and
the first application is determined to have visited the first website but not the second because of a difference in UI event sequences.
18. The medium of claim 16, wherein the operations comprise:
reporting, with the monitoring service, one or more metrics based on the sequence of web addresses to a remote server; and
receiving metrics indicative of visited web addresses from more than 1,000 mobile computing devices executing respective instances of the monitoring service with the remote server.
19. The medium of claim 16, wherein the operations comprise:
steps for monitoring web navigation via an accessibility application program interface.
20. The medium of claim 1, wherein:
the first UI layout component is distinct from web content of a website rendered by the first application.
21. The medium of claim 1, the operations comprising:
tracking, based on the stored identifier of the first UI layout component, web navigation on the mobile computing device without the monitoring service accessing network events on a network interface of the mobile computing device and, without accessing one or more of:
a privileged position on the web-browser, or
a document-object model of the web-browser.
22. A method, comprising:
executing, on a mobile computing device, a monitoring service configured to communicate with an accessibility application program interface (API) of an operating system of a mobile computing device, wherein:
the accessibility API reports state of a user interface (UI) layout displayed by the mobile computing device to the monitoring service,
the accessibility API reports UI events indicative of changes in the UI layout to the monitoring service, and
the monitoring service executes in one or more processes that are different from processes of at least some applications monitored by the monitoring service on the mobile computing device;
receiving, with the monitoring service, a first UI event indicating focus of the UI has shifted;
in response to receiving the first UI event, determining with the monitoring service, based on parameters of the first UI event, whether focus of the UI shifted to an application including web browser functionality;
in response to determining that focus of the UI shifted to a first application that is an instance of a web browser, receiving with the monitoring service, at least some UI events associated with UI layout components of the first application;
determining, with the monitoring service, to select a first UI layout component of the first application as including a web-browser address bar from among a plurality of UI layout components of a UI layout of the first application based on the received UI events, wherein:
the first UI layout component is selected based on both detecting a pattern of UI events in a sequence of events received by the monitoring service from the operating system and an attribute of the first UI layout component, and
the pattern of UI events includes at least one UI event indicative of a user interaction and having a UI event parameter that associates the event with the first UI layout component; and
storing, in memory accessible to the monitoring service, an identifier of the first UI layout component in association with the first application to indicate the selection of the first UI layout component as including the web-browser address bar of the first application.

23. The method of claim 22, wherein:
code of the monitoring service is installed on the mobile computing device more than an hour before being executed;
the accessibility API reports state of a user interface UI layout displayed by the mobile computing device in a standardized format across a plurality of different types of applications executable on the mobile computing device, at least some of the plurality of different types of applications being applications that are not web browsers;
the UI layout includes a hierarchical arrangement of UI layout components;
the UI layout is distinct from a document object model of a web document in program state of a web browser; and
the monitoring service is assigned a different virtual memory address space by the operating system than the first application.

24. The method of claim 22, wherein the operations comprise:
receiving a second event indicating that focus of the UI has shifted;
in response to receiving the second event, determining with the monitoring service, based on parameters of the second event, whether focus of the UI shifted to an application including web browser functionality, wherein the application is a second application, different from the first application, that includes a web browser;
in response to determining that the second application includes a web browser, determining that a designated UI layout component of a UI layout of the second application including a plurality of UI layout elements is designated in memory as having an address bar of the second application in virtue of previously designating the designated UI layout component with the monitoring process; and
in response to determining that the designated UI layout component is designated as having the address bar of the second application, comparing a subsequent sequence of events from the accessibility API to detect a navigation pattern, the navigation pattern specifying at least some events that have an event parameter identifying the designated UI layout component.

25. The method of claim 22, wherein:
at least some UI layout components of the UI layout of the first application change while determining whether to select the first UI layout component from among a plurality of UI layout components such that some UI layout components are added and some UI layout components are removed between when the first application is determined to be a web browser and when the first UI layout component is determined to be selected.

26. The method of claim 22, wherein:
the first UI layout component is selected based on detecting both a positive pattern of UI events and determining that a negative pattern of UI events has not been received by the monitoring service during at least some portion of a sequence of events that satisfies the positive pattern of UI events.

27. The method of claim 22, wherein:
the pattern of UI events specifies a sequence of UI events including a type_view_focused event.

28. The method of claim 22, wherein:
the pattern of UI events specifies a sequence of UI events including a keyboard down event.

29. The method of claim 22, wherein:
the pattern of UI events specifies a sequence of UI events including a type_view_focused event; and
the pattern of UI events specifies a sequence of UI events including a keyboard down event.

30. The method of claim 22, wherein:
the pattern of UI events specifies a sequence of UI events including a text changed event.

31. The method of claim 22, wherein:
the pattern of UI events specifies a sequence of UI events including:
a type_view_focused event;
a keyboard down event; and
a text changed event; and
the pattern of UI events specifies that a parameter of the type_view_focused event must identify the same UI layout component as a parameter of the text changed event.

32. The method of claim 22, wherein:
the first UI layout component is selected based on the first UI layout component having an attribute indicating the first UI layout component is configured to receive user-input text.

33. The method of claim 22, wherein:
the first UI layout component is selected upon determining that text entered into the first UI layout component matches to a regular expression that detects uniform resource identifiers.

34. The method of claim 22, wherein:
the pattern of UI events specifies a sequence of UI events including:
a type_view_focused event;
a keyboard down event; and
a text changed event;
the pattern of UI events specifies that a parameter of the type_view_focused event must identify the same UI layout component as a parameter of the text changed event;
the first UI layout component is selected based on the first UI layout component having an attribute indicating the first UI layout component is configured to receive user-input text; and
the first UI layout component is selected upon determining that text entered into the first UI layout component matches to a regular expression that detects uniform resource identifiers.

35. The method of claim 22, wherein:
selecting the first UI layout component is done in response to determining that the first UI layout component is not already associated in memory of the monitoring application with the first application.

36. The method of claim 22, comprising:

determining, with the monitoring application, to not select a second UI layout component of the first application that includes text of a uniform resource identifier based on the second UI layout component being associated with a sequence of UI events received by the monitoring application from the operating system that satisfy a negative pattern of UI event sequences.

37. The method of claim 22, comprising:

detecting a sequence of web addresses visited by the first application based on text in UI layout components of the first application identified based on the identifier of the selected first UI layout component stored in memory.

38. The method of claim 37, wherein:

detecting the sequence of web addresses comprises:
    determining that a first uniform address locator was entered into the web-browser address bar and that the first application visited a first website specified by the first uniform address locator; and
    determining that a second uniform address locator was entered into the web-browser address bar and that the first application did not visit a second website specified by the second uniform address locator; and
the first application is determined to have visited the first website but not the second because of a difference in UI event sequences.

39. The method of claim 37, comprising:

reporting, with the monitoring service, one or more metrics based on the sequence of web addresses to a remote server; and receiving metrics indicative of visited web addresses from more than 1,000 mobile computing devices executing respective instances of the monitoring service with the remote server.

40. The method of claim 37, comprising:

steps for monitoring web navigation via an accessibility application program interface.

41. The method of claim 22, wherein:

the first UI layout component is distinct from web content of a website rendered by the first application.

42. The method of claim 22, comprising:

tracking, based on the stored identifier of the first UI layout component, web navigation on the mobile computing device without the monitoring service accessing network events on a network interface of the mobile computing device and, without accessing one or more of:
    a privileged position on the web-browser, or
    a document-object model of the web-browser.

\* \* \* \* \*